United States Patent
Kreuss et al.

(10) Patent No.: US 10,548,337 B2
(45) Date of Patent: Feb. 4, 2020

(54) PROCESS FOR THE PREPARATION OF WHEY PROTEIN AGGREGATE PARTICLES AND USE THEREOF

(71) Applicant: NESTEC S.A., Vevey (CH)

(72) Inventors: Markus Kreuss, Konolfingen (CH); Aristodimos Lazidis, Birmingham (GB)

(73) Assignee: Societe des Produits Nestle S.A., Vevey (CH)

(*) Notice: Subject to any disclaimer, the term of this patent is extended or adjusted under 35 U.S.C. 154(b) by 388 days.

(21) Appl. No.: 14/899,067

(22) PCT Filed: Jun. 25, 2014

(86) PCT No.: PCT/EP2014/063436
§ 371 (c)(1),
(2) Date: Dec. 16, 2015

(87) PCT Pub. No.: WO2014/207062
PCT Pub. Date: Dec. 31, 2014

(65) Prior Publication Data
US 2016/0120206 A1  May 5, 2016

Related U.S. Application Data

(60) Provisional application No. 61/839,216, filed on Jun. 25, 2013.

(30) Foreign Application Priority Data

Jun. 25, 2013 (EP) .................................... 13173815

(51) Int. Cl.
A23C 21/00 (2006.01)
A23J 3/08 (2006.01)

(52) U.S. Cl.
CPC ................. *A23J 3/08* (2013.01); *A23C 21/00* (2013.01); *A23V 2002/00* (2013.01)

(58) Field of Classification Search
CPC .......... A23J 3/08; A23C 21/00; A23V 2002/00
USPC ....... 426/443, 453, 520, 573, 580, 583, 656, 426/657
See application file for complete search history.

(56) References Cited

U.S. PATENT DOCUMENTS 5,494,696 A   2/1996 Holst et al.
6,767,575 B1  7/2004 Huss et al.
7,811,620 B2* 10/2010 Merrill .................... A23G 3/32
                                                    426/583
2002/0039617 A1  4/2002 Villagran et al.
2009/0035437 A1  2/2009 Bovetto et al.
2012/0121776 A1  5/2012 Arnaudov et al.

FOREIGN PATENT DOCUMENTS

DE   102012216990 A1   3/2013
WO    2012104286 A1   8/2012

OTHER PUBLICATIONS

De La Fuente et al. "Recent advances in characterisation of heat-induced aggregates and intermediates of whey proteins" Trends in Food Science & Technology, 2002, vol. 13, pp. 262-274.
Zhu et al. "Heat-Induced Conformational Changes in Whey Protein Isolate and Its Relation to Foaming Properties" Journal of Agricultural & Food Chemistry, 1994, vol. 42, No. 4, pp. 846-855.
Examination Report issued in corresponding Australian Patent Application No. 2014301166 dated Jun. 6, 2017.
CP Kelco Microparticulated Whey Protein Concentrate [retrieved from the Internet on May 11, 2017] <URL: https://www.cpkelco.com/products/microparticulated-whey-protein-concentrate/> published online.
Simplesse® Microparticulated Whey Protein Concentrate [retrieved from the intetnet on May 11, 2017] <URL:https://www.cpkelco.com/wp-content/uploads/2012/08/SIMPLESSE_WIYC_Brochure.pdf> published on Sep. 1, 2012.
Microparticulation of Whey Proteins—Application in Dairy <URL: http://www.inofood.cl/neo_2011/pdf/PRE_PDF/LUNES_TARDE_2/Microsoft%20PowerPoint%20-%202%20BERIT%20SKINDERSOE%20-%20SPX%20[Modo%20de%20compatibilidad].pdf> Published on Nov. 23, 2011.
Lazidis et al., "Stabilisation of Foams by Whey Protein Gel Particles", Gums and Stabilisers for the Food Industry 17: The Changing Face of Food Manufacture: The Role of Hydrocolloids, Apr. 16, 2014, 9 pages.
Lazidis et al., "Protein Particulate Stabilised Foams", University of Birmingham, Jun. 27, 2013, 24 pages.
Foegeding et al., "Factors Determining the Physical Properties of Protein Foams", Food Hydrocolloids, vol. 20, No. 2-3, Mar. 1, 2006, pp. 284-292.
Firebaugh et al., "Emulsifying and Foaming Properties of a Derivatized Whey Protein ingredient", International Journal of Food Properties, vol. 8, No. 2, 2005, pp. 243-253.

\* cited by examiner

*Primary Examiner* — Leslie A Wong
(74) *Attorney, Agent, or Firm* — K&L Gates LLP (57) ABSTRACT

The present invention relates to whey protein aggregate particles that can be used to stabilize foams, and more particularly edible foams, such as foamed dairy products. The invention provides a process for preparation of such whey protein aggregates, for the use of such particles for stabilizing foam, as well as edible foams or foamed product comprising such whey protein aggregate particles.

20 Claims, 10 Drawing Sheets

PROCESS FOR THE PREPARATION OF WHEY PROTEIN AGGREGATE PARTICLES AND USE THEREOF

CROSS REFERENCE TO RELATED APPLICATIONS

The present application is a National Stage of International Application No. PCT/EP2014/063436, filed on Jun. 25, 2014, which claims priority to U.S. Provisional Application Ser. No. 61/839,216, filed Jun. 25, 2013, and European Patent Application No. 13173815.5, filed Jun. 26, 2013, the entire contents of which are being incorporated herein by reference.

FIELD OF THE INVENTION

The present invention relates to whey protein aggregate particles that can be used to stabilize foams, and more particularly edible foams, such as foamed dairy products. The invention provides a process for preparation of such whey protein aggregate particles, use of such particles for stabilizing foam, as well as edible foams or foamed product comprising such whey protein aggregate particles.

BACKGROUND OF THE INVENTION

There is a rising trend in the area of food products and beverages to provide at least part of the product in the form of foam. This raises technical challenges to provide foams that remain stable for a long time.

Foams are meta-stable systems of very low shelf life. The gas bubbles, which are dispersed in a liquid phase are stabilized by thin films of surfactants (e.g. milk proteins). As soon as a foam is formed, destabilization occurs due to drainage (liquid drains by gravity), coalescence and disproportionation (due to gas pressure differences between bubbles of unequal size).

Foams and emulsions are behaving in different ways, so that specific solutions have to be developed for the stabilization of foams or emulsions, respectively. Foams are thermodynamically more unstable and generally have a lifetime of some orders of magnitude smaller than emulsions (hours compared to months). The main reasons for this are that the films between bubbles are generally much larger than between emulsion droplets and the interfacial tension on the air-water interface is larger than on the oil-water interface by a factor of around 5. Also, bubbles are typically larger and less dense than oil droplets and therefore gravity creaming is much faster for foams than for oil in water emulsions. Foams are therefore prone to drainage, disproportionation (the equivalent of Ostwald ripening in emulsions) and coalescence. Additionally, when considering foams, the different instability mechanisms can reinforce each other by acting synergistically towards the collapse of the foam. For example, disproportionation results in larger bubbles and therefore larger films which in turn accelerate drainage, continuously decreasing the foam stability. Therefore, it is impossible to infer that an emulsifier successful to stabilize an emulsion would also be successful in stabilizing foam. The reverse is also true. Specific stabilizers have to be developed for foams.

Foam destabilization can be delayed by high viscosities of the liquid phase (like in a mousse), by drying the system (e.g. dough) or by freezing the system as in ice cream. However, it is still desirable to find solutions to the problem of stabilizing liquid foams.

It is known, that particles can stabilize foams due to the so called Pickering-effect. Numerous publications describe this effect in details. However there is still a need to identify suitable food-grade particles, which act as Pickering particles to stabilize food foams.

There is an additional trend to increase the stability of foams while trying not to introduce new ingredients to formulations. Especially in milk products, it is desired to improve the properties of such milk products, including foam stability, while using existing components of milk. The whey protein fraction of milk has been widely used in food formulations because of its high nutritional value but also for its broad functional properties. For example E. A. Foegeding, P. J. Luck, and J. P. Davis, Food Hydrocolloids, 2006, 20, 284-292 studies the ability of whey protein isolates (WPI) to stabilize foams.

H. Zhu and S. Damodaran, J. Agric. Food Chem., 1994, 42, 846-855 has shown that polymerisation of whey protein fractions by sulfhydryl-disulfide interactions improve the foaming properties. While proteins can form films with high interfacial elasticity and viscosity through the various forms of cross-linking of the adsorbed molecules on the interface, it was found that they still can't completely stop bubble shrinking and foam instability and there is therefore still a need to find new foam stabilizers. In addition this type of stabilization increases the viscosity and stiffness of the foam. It is desirable to find solutions to stabilize foam while retaining its liquid appearance.

A large number of products exist on the market, which are in powder form and are intended to be reconstituted by the consumer and to foam upon reconstitution, such as coffee and tea creamers. This is also true for powdered products intended to be reconstituted in vending or beverage preparation machines. In such a case, it would be very advantageous to find a foam stabilizer in the form of solid particles that could be incorporated in the powder product.

J. D. Firebaugh and C. R. Daubert, International Journal of Food Properties, 2005, 8, 243-253 teaches that dried derivatized whey protein isolates are capable of stabilizing foams at least as well as native whey protein isolates. In particular, it describes that derivatized whey protein isolates create foams that are more stable and have lower overrun than unmodified WPI foams when the pH of the foam is adjusted to pH 3.4 and 6.8. Derivatized whey protein isolate is produced at pH 3.4.

The present invention addresses the above-mentioned problems by providing an efficient solution for the stabilization of foams.

SUMMARY OF THE INVENTION

In a first aspect, the invention provides a process for the preparation of whey protein aggregate particles comprising the following steps:
 a. dispersing whey protein in an aqueous medium to form an aqueous solution;
 b. adjusting the pH of the solution obtained in step a) to a pH above 7;
 c. allowing the whey protein to hydrate in the solution obtained in step b);
 d. denaturing and gelling the whey protein by heating the solution of hydrated whey protein obtained in step c);
 e. drying the denatured and gelled whey protein obtained in step d) to form dry whey protein aggregate; and
 f. reducing the dried whey protein aggregate to a particle powder.

In a second aspect, the invention provides whey protein aggregate particles obtainable by the process of the invention.

In a third aspect, the invention provides for the use of whey protein aggregate particles according to the invention for stabilizing an edible foam.

In a fourth aspect, the invention provides a foamed edible product comprising whey protein aggregate particles according to the invention.

In a fifth aspect, the invention provides a method for producing a foamed product comprising
   a. adding whey protein aggregate particles of the invention to an edible composition prior to formation of the foam; and
   b. inducing foam formation in the edible composition obtained in step a), so as to form a foamed edible product.

In a sixth aspect, the invention provides a method for stabilizing a foam, comprising adding whey protein aggregate particles of the invention to an edible composition intended to be foamed prior to formation of the foam.

DETAILED DESCRIPTION OF THE INVENTION

The present inventors have now developed new whey protein aggregate particles having particularly efficient foam stabilization effects.

In the first step of the process to prepare these new whey protein aggregate particles, whey protein have to be dissolved in water. Any source of whey protein can be used, such as for example whey protein isolate, whey protein concentrate or skim milk. Preferably, the whey protein is used in a form that is as pure as possible, so as to avoid the presence of lactose or fat in the whey protein preparation. Typically, whey protein isolate and whey protein concentrate, preferably whey protein isolate are used. Such ingredients for example can contain between 80 and 90% of whey protein.

The whey is dissolved in an aqueous medium, which is preferably water and more preferably demineralised water. Typically the whey protein concentration in the aqueous solution is of at least 5% by weight, based on the total weight of the solution. Preferably the whey protein concentration is of at least 6%, preferably at least 7%, preferably at least 8%, more preferably at least 9% and most preferably it is at least 10%. The maximum practical concentration in the aqueous solution depends on the solubility of the protein and can be determined by the person skilled in the art. Preferably, concentrations such as up to 40%, preferably up to 35%, more preferably up to 30%, even more preferably up to 20% can be used. In a most preferred embodiment, the concentration of whey protein in the aqueous solution is of at most 14%, more preferably at most 13%, more preferably at most 12%, even more preferably at most 11%. For example the aqueous solution can comprises 10% of whey protein.

In a second step of the process, the pH of the solution is adjusted to a pH above 7. Preferably, the pH to which the solution is adjusted in step b) is at least 7.1, preferably at least 7.2, more preferably at least 7.3, more preferably at least 7.4, more preferably at least 7.5, more preferably at least 7.6, more preferably at least 7.7, more preferably at least 7.8, even more preferably at least 7.9, most preferably at least 8. In another preferred embodiment of the invention, the pH to which the solution is adjusted in step b) is at most 9, preferably at most 8.9, more preferably at most 8.8, more preferably at most 8.7, more preferably at most 8.6, more preferably at most 8.5, more preferably at most 8.4, more preferably at most 8.3, more preferably at most 8.2, even more preferably at most 8.1, most preferably at most 8. In a most preferred embodiment of the invention, the pH of the solution is adjusted to pH 8. The upper limit of pH 9 is preferred to ensure safety of the obtained particles in view of human consumption in food and beverage applications.

In the third step of the process, the whey protein is allowed to hydrate in the solution. The hydration time depends on the whey protein concentration. This time can be defined by the person skilled in the art based on the concentration of whey protein used. The degree of hydration can be measured by standard methods to ensure that proper hydration is achieved. An example of time and temperature at which the hydration step can be carried out is provided in the experimental section of Example 1.

In fourth step of the process, the solution of hydrated whey protein is subjected to a heat treatment to cause denaturation and gelling of the whey proteins. During this step the proteins are denatured, unfolded and form aggregates responsible for the formation of a gel. The heat treatment is typically applied in a way to achieve more than 90% of beta-lactoglobulin denaturation. The heat treatment has to be carried out above the temperature at which whey protein denaturates, i.e above 76° C. The temperature and time needed for proper denaturation and gellation can be defined by the person skilled in the art based on the concentration of whey protein used. The degree of denaturation and gellation can be measured by standard methods to ensure that proper denaturation and gellation is achieved. An example of time and temperature at which the denaturation and gellation step can be carried out is provide in the experimental section of Example 1. A heat treatment of 80° C. for 30 minutes can for example be applied. The denaturation and gelation step can be carried out either under shear or in a quiescent state. Preferably, the denaturation and gelation step is carried out in a quiescent state.

In a fifth step of the process of the invention, the denatured and gelled whey proteins are dried. The drying can be carried out by any method suitable to dry this type of gel. For example, freeze drying or rotary drum drying are used. The preferred method is freeze drying. These methods are well known to the person skilled in the art, since standard methods and equipments can be used for the purpose of the present invention. In typical freeze drying method, the solution of denatured and gelled protein is cooled down to room temperature, frozen to −20° C. and then dried.

In a sixth step of the process, the dry whey protein aggregate gel formed in the end of the fifth step is further reduced to powder. This can be carried out using any method suitable to break the dried gel, such as grinding or milling.

The steps of drying the gel followed by milling or grinding confer a particular structure to the obtained particles, which are namely characterized by an irregular, non-spherical, shape with edges. These particles are also insoluble.

Preferably at least 90% by volume of the particles obtained by the present process have a particle size of at least 5 μm. In another preferred embodiment at least 90% by volume of the particles obtained by such process have a particle size of at most 1000 μm, preferably at most 500 μm, more preferably at most 300 μm, most preferably at most 50 μm. Preferably the particle size is retained when the particles are reconstituted in aqueous medium.

As shown below in the examples section, the whey protein aggregate obtained by the process described above exhibits particularly efficient foam stabilizing properties. In addition, these particles are food grade and formed of whey, which is a natural component of milk.

It has been identified by microscopic studies that the whey protein aggregate particles obtained by the process of the present invention retain their particulate structure when reconstituted in aqueous medium and that the protein aggregation is also retained. Without being bound by theory, this is expected to provide the advantageous foam stabilizing effect of the particles of the present invention.

The whey protein aggregate particles of the present invention can advantageously be used to form a foam or to promote formation of a foam. In other words, a method for creating a foam or to promote the formation of a foam comprises the step of adding the particles to a product to be foamed prior to foam formation and then inducing foam formation.

The particles of the present invention are also particularly advantageously used for stabilizing foams, and more particularly edible foams. In other words, the present invention provides a method for stabilizing foam, comprising adding whey protein aggregate particles of the invention to an edible composition intended to be foamed prior to formation of the foam.

The invention also provides advantageously a method for producing a foamed product comprising
  a. adding whey protein aggregate particles according to the invention to an edible composition prior to formation of the foam; and
  b. inducing foam formation in the edible composition obtained in step a), so as to form a foamed edible product.

It has been surprisingly found that foam stabilization is particularly efficient when the whey protein aggregate particles are used in concentrations of at least 1.5%, preferably at least 2%, more preferably at least 2.5%, most preferably at least 3% by weight, based on the total weight of the foam. The maximum concentration of whey protein aggregate particles to be used is preferably at most 8%, preferably at most 7%, more preferably at most 6% by weight, based on the total weight of the foam.

Foamed edible products are also encompassed by the invention. Typically, foamed edible products include all foamed products that can be consumed orally, such as food or beverage products comprising a foam component. Foamed products also include products that are provided in dry form but are intended to form foam once reconstituted in liquid by the end consumer or in a beverage preparation machine.

Preferred foamed products for the purpose of the present invention are products comprising casein. Preferably, such products are dairy products, because whey is a natural ingredient of milk. Products encompassed by the present invention typically include products based on whole milk, skimmed milk or semi-skimmed milk. Also particularly advantageous foamed products include non-dairy products that include casein and optionally other milk ingredients. This is for example the case of non-dairy creamers or filled creamers that are used for coffee and tea or of the white part of coffee mixes.

Typical product categories including such foamed products therefore include dairy, non dairy or filled creamers, desserts, ice cream, confectionery or culinary product.

The present invention will now be described in further details by the way of the following examples.

Example 1

1. Materials

Whey protein isolate (BiPRO) was obtained from Davisco Foods International Inc. (Le Sueur, Minn.). Protein solutions were prepared in double distilled deionised water and the pH was adjusted using NaOH or HCl (5 M) and $NaN_3$ (0.001 wt %) was added to prevent microbiological growth. All chemicals were obtained from Sigma Aldrich (Dorset, UK).

2. Experimental Methods 2.1 Preparation of Dried Whey Protein Aggregate Particles Whey protein isolate (WPI) was dispersed in aqueous solutions at 10 wt % protein concentration using double distilled water and left stirring to hydrate for 1 h. The pH of the solutions was then adjusted to the desired value using 5M NaOH or 5M HCl. The protein solutions were subjected to heating and gelling in a water bath at 80° C. for 30 minutes. Following the heating step the gels were cooled down in trays and then frozen at −20° C. for 24 h. The frozen gels were then freeze dried in a bench top freeze dryer, Scanvac model 110-4, (Copenhagen, Denmark) until samples reached room temperature. The dried gels were finally reduced in size using a ball mill for 2 hours. The gel particle powders were then re-dispersed in double distilled water at the desired concentration and hydrated for at least 2 hours under moderate stirring. The pH was not further re adjusted upon reconstitution but was almost identical to the initial pH during gelation. The concentrations studied were 1%, 3% and 5% and the properties of the whey protein aggregate particles were always compared to the properties of non aggregated whey protein isolate solutions, which were used as a control. From this point and on the pH values of the particles refer to the pH at which the gel particles were manufactured.

2.2. Preparation of Foams and Foam Stability Determination

Foams were prepared with two different methods, gas sparging and mechanical whipping. When foam stability was assessed, foams were prepared by bubbling using a method adapted from literature. Foam therefore, was created inside a clear acrylic rectangular column (60×60 mm internal dimensions and 500 mm height) by air sparging at a rate of 3 l/min and pressure of 2 bars through the bottom of the column where a porosity 3 (15-40 μm pores) glass sintered plate is located. A sample of 100 ml suspension was placed in the column and then air sparging was initialised until the production of a foam head of 20 cm. The reduction of the height of the foam head was then recorded with a CCD camera and the foam half-life was later calculated.

In all other measurements, foams were produced by mechanical whipping using a commercial milk frother with a spiral impeller of 10 mm diameter rotating at approximately 2000 rpm. For the means of foam production, 20 ml of sample was placed in a 100 ml glass beaker and whipped for 30 seconds. All measurements were performed at 25° C. unless otherwise stated.

2.3 Particle Size Measurements

The particle size distributions of the dried gel particles obtained after the milling step were determined by laser diffraction after dispersing the powders in water at a concentration of 0.25 wt % and using a Malvern Mastersizer 2000 with a Hydro SM manual small volume dispersion unit attached (Malvern Instruments, UK). The scattered intensity as a function of the angle was transformed into size distribution using the Mie theory and the relevant refractive index for the protein (1.456) was used.

2.4 Rheological Characterisation of the Bulk Solutions and the Resulting Foams

Viscosity and rheological measurements were performed using a Kinexus rheometer by Malvern Instruments (Malvern, UK). Flow curves of the protein solutions were obtained by using a cup and bob geometry (25 mm and 27.5 mm diameter respectively) and applying a range of shear rates (0.1-100 s−1) while measuring the viscosity. The flow curves of foams were determined using a 60 mm serrated parallel plate geometry and applying a smaller range of shear rates (0.1-10 s−1). The rheological properties of both the bulk phase and the foams were determined by oscillatory rheology by applying a strain controlled frequency sweep at a strain rate within the linear viscoelastic region of the samples as defined by an amplitude sweep performed beforehand using a similar sample. In the case of the bulk phase the oscillations were performed using the 60 mm sandblasted parallel plates and in the case of the foams the 60 mm serrated plates in order to eliminate slippage.

2.5 Surface Tension

The Wilhelmy plate method was used to measure the static surface tension of the solution using a K100 Tensiometer from Kruss GmbH (Hamburg, Germany).

2.6 Confocal Laser Scanning Microscopy (CLSM)

The microstructure of the whey protein aggregate particles in the foams were visualised at 20° C. using a confocal scanning laser microscope Leica TCS SPE (Heidelberg, Germany) equipped with laser operating at a wavelength of 532 nm. Images were obtained using 10× magnification. The WPI gel particles were stained with rodhamine B (0.01 wt %) that was introduced prior to the gelation step.

Figure 1:
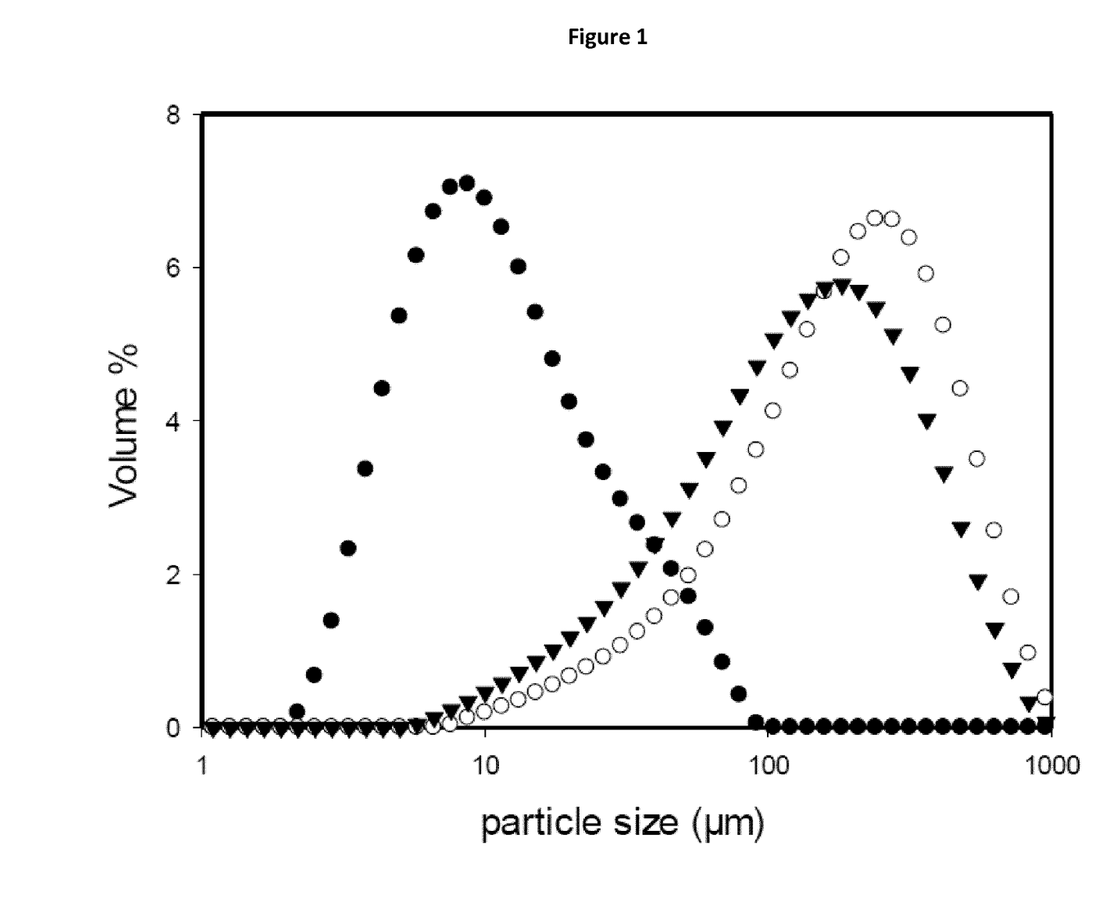
FIG. 1 shows the particle size distribution of gel particles made at pH 5 (black dots), pH 7 (white dots) and pH 8 (triangles) according to example 1.

3. Results and Discussion 3.1 Properties of the Whey Protein Isolate Gel Particles 3.1.1 Particle Size of the Gel Protein Particles It has been shown that protein aggregates created at pH 7 and higher have a fibrous shape while aggregates prepared at lower pH close to the isoelectric point (around 4.9 for whey) have a more compact spherical shape 15. Additionally, the available sulfhydryl groups are more active at pH 7 while at pH 8 they can easily form disulfide bonds, possibly due to oxidation of a thiol group 16. This can explain the fact that heat induced whey protein gels show higher elastic modulus values for the temperature range (20-80° C.) at pH values 7 and 8 (data not shown). Therefore, whey protein gels were prepared with the method described at three different pH conditions, close to the isoelectric point of the whey proteins (pH 5.0), at neutral (pH 7.0) and at slightly basic (pH 8.0). At pH 5 the gel obtained was white and brittle while the gels obtained at pH 7 and 8 where clear and elastic as described in the literature 17. The quiescent gels were dried by means of freeze drying and milled at similar conditions. The powders obtained where analysed in terms of particle size after being dispersed in water (FIG. 1). The dried gels made at pH 5 produced smaller particles (D4, 3=16.58 μm) probably due to the fact that they are more brittle while the gels at pH 7 and 8 produced larger particles (D4,3=259 μm and 193 μm respectively).

FIG. 1 shows the particle size distribution of particles made at pH 5 (black dots), pH 7 (white dots) and pH 8 (triangles).

3.1.2 Interfacial Tension

Figure 2:
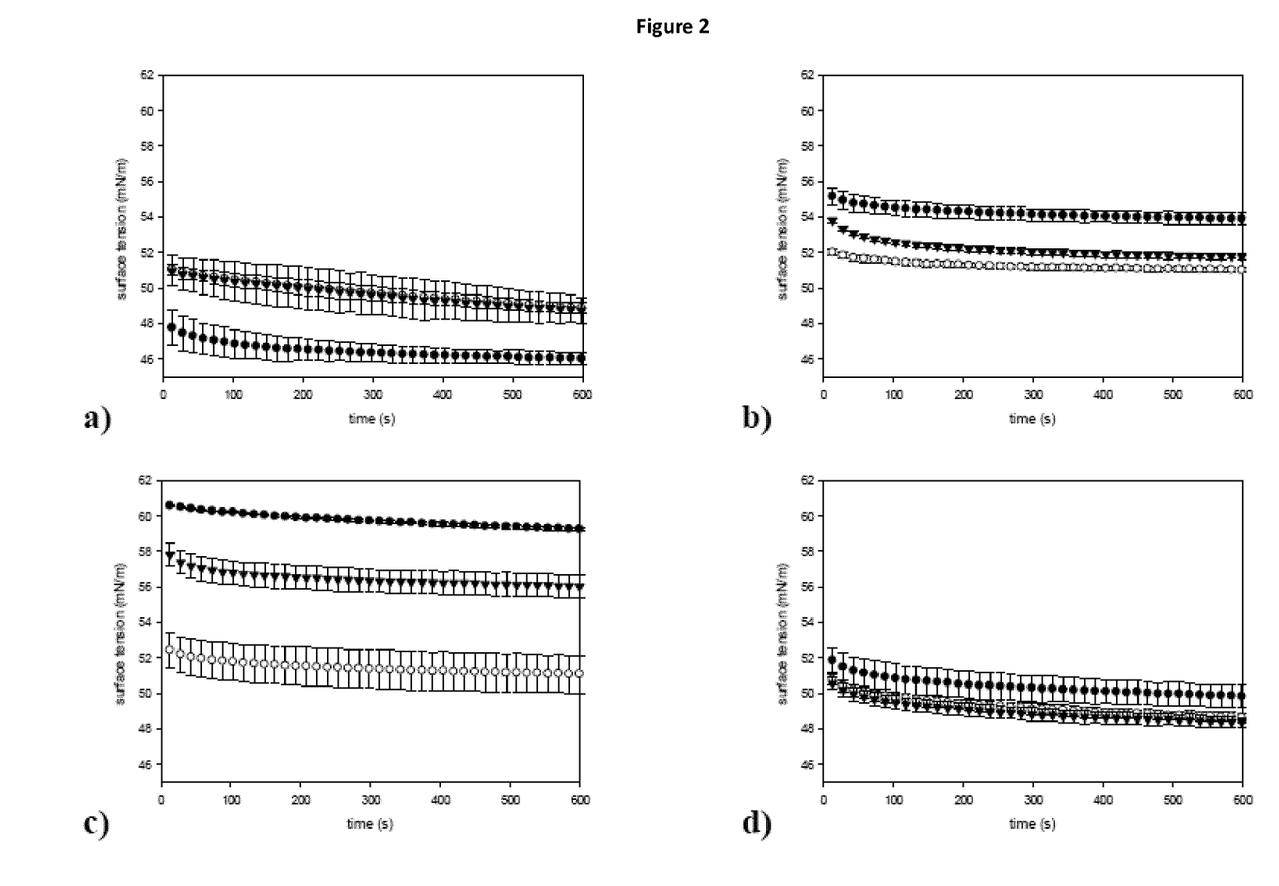
FIG. 2 represents the surface tension over time curves of gel particle suspensions prepared at pH 5 (a), pH 7 (b), pH 8 (c) and native WPI solutions (d) at concentrations of 1% (black dots), 3% (white dots) and 5% (triangles), as prepared in accordance with Example 1.

The effect of the gel particles in terms of lowering the surface tension upon suspension in water was also assessed and compared to the effect of WPI. The results show that the surface tension lowering effect was stronger for the non-thermally treated WPI proteins as expected (FIG. 2d). The solutions containing the particles prepared at pH 5 also had similar surface tension values (FIG. 2a) to the non-treated WPI probably due to the fact that after gelling at this pH there are still significant amounts of non-aggregated proteins. The suspensions containing the particles made at pH 7 and 8 show similar surface tension values that are higher than the control and the suspensions of the particles gelled at pH 5 (FIGS. 2b and c). Additionally, the suspensions with the pH 7 and 8 particles show greater dependency on concentration with a concentration of 3% having lower surface tension than 1% and 5% which is counter intuitive.

FIG. 2 represents the surface tension over time curves of gel particle suspensions prepared at pH 5 (a), pH 7 (b), pH 8 (c) and native WPI solutions (d) at concentrations of 1% (black dots), 3% (white dots) and 5% (triangles).

3.2 Rheological Properties
3.2.1 Rheological Properties of the Bulk Suspensions The three different whey protein aggregate particle samples were dispersed in distilled water at three different concentrations (1%, 3% and 5% wt.) and the properties of the suspensions were assessed in terms of viscosity and rheological properties in order to understand the effect of those particles on the mechanical properties while they were suspended in water and see the effect that this might have on their functional properties during foaming.

Figure 3:
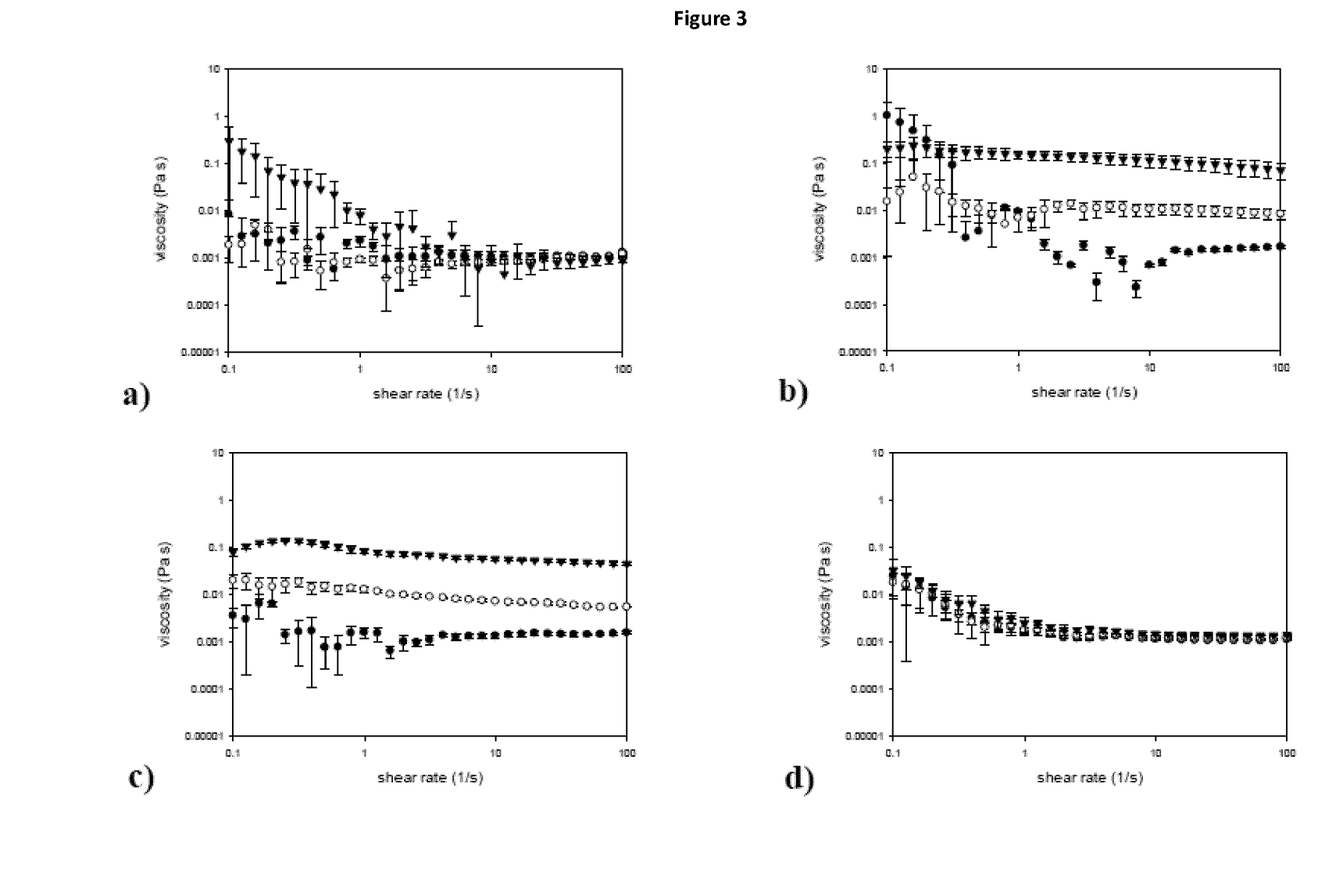
FIG. 3 represents the flow curves of gel particle suspensions prepared at pH 5 (a), pH 7 (b), pH 8 (c) and native WPI solutions (d) at concentrations of 1% (black dots), 3% (white dots) and 5% (triangles), as prepared according to Example 1.

FIG. 3 represents the flow curves of gel particle suspensions prepared at pH 5 (a), pH 7 (b), pH 8 (c) and native WPI solutions (d) at concentrations of 1% (black dots), 3% (white dots) and 5% (triangles).

The flow curves generated with shear rate changes indicate shear thinning behaviour for the gel particles created at pH 5, this is an indication of the presence of aggregates which break at higher shear values lowering the viscosity (FIG. 3a). The particles of the gels prepared at pH 7 and pH 8 have almost Newtonian behaviour within the shear rate range studied and similar values between them. There is a distinct difference between the 3 concentrations for these two samples especially for higher shear rate values. The pH 7 and pH 8 gel particle suspensions also have significantly higher viscosities than the native protein suspension for the concentration of 5%.

The explanation for this is the difference in particle size. WPI and gel particles made at pH 5 are significantly smaller than the gel particles made at pH 7 and 8 and therefore their suspensions are less resistant to flow which is reflected in the viscosity values recorded.

Figure 4:
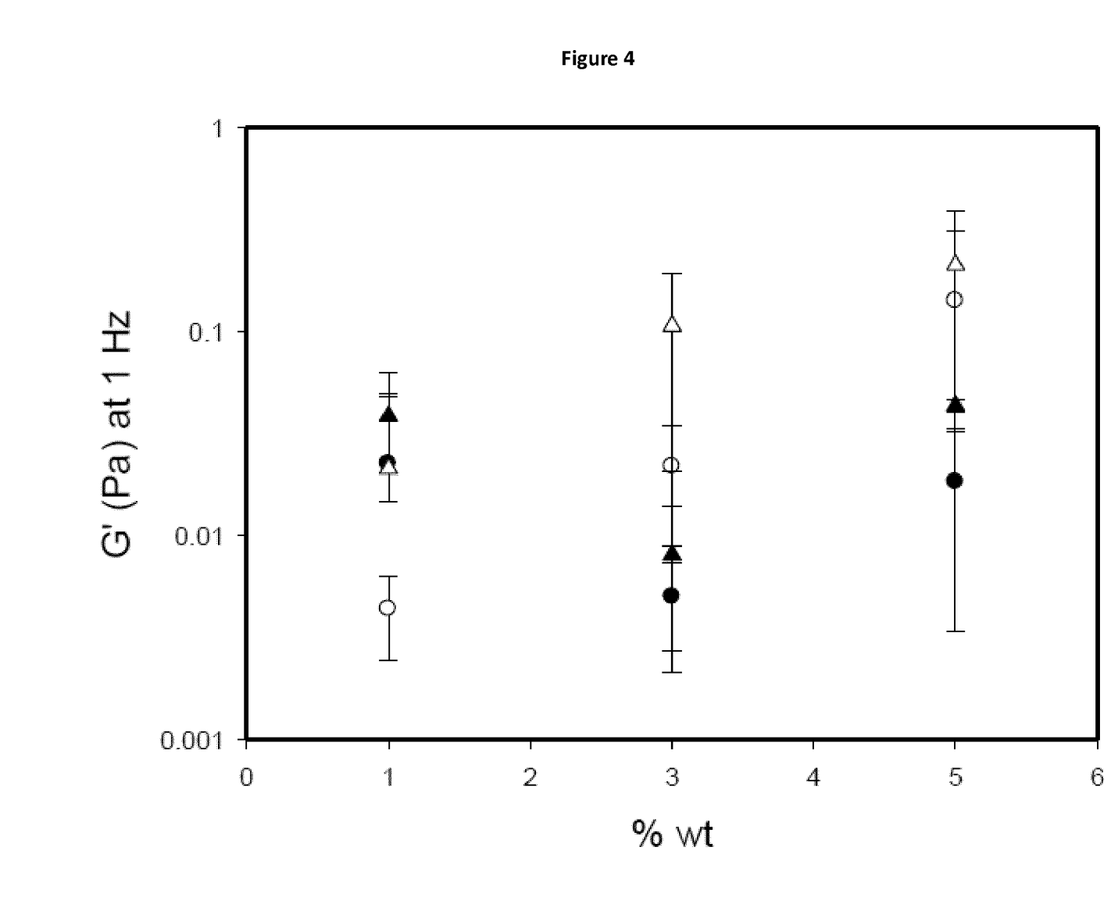
FIG. 4 represents the elastic modulus (G') at 1 Hz of the dispersions of gel particles made at pH 5 (black dots), pH 7 (white dots) and pH 8 (black triangles) and the WPI solutions (white triangles) at the 3 different concentrations, as prepared in Example 1.

The effect of the 3 different gel particles on the bulk properties of suspensions upon reconstitution was also assessed in terms of storage and loss modulus. Frequency sweeps performed within the linear viscoelastic region for all the samples did not show significant difference between the whey protein aggregate particle suspensions made at the three different pH values and the control. In FIG. 4 the elastic modulus of all samples at 1 Hz have been plotted to make the comparison easier. The effect of the size and the nature of the different particle suspensions do not seem to significantly affect the bulk rheological properties of the suspensions.

3.2.2 Rheological Properties of the Foams

The rheological properties of the foams created with the different whey protein aggregate particles were evaluated in terms of shear viscosity and oscillatory rheology. Foams stabilised by the three different whey protein particle suspensions and the WPI (control) were prepared by mechanical whipping under the same conditions.

All the foams displayed shear thinning behaviour which can be explained by the disruption of the bubble structure under shear (data not shown). In terms of viscosity values the viscosities at 0.25 s−1 are presented in FIG. 5 to facilitate comparison. The viscosity of the foams made with gel particle suspensions made at pH 8 was higher than the rest and not significantly dependent on the concentration. At a concentration of 5% the foams stabilised by gel particles gelled at pH 7 were equally high to the ones at pH 8 but showed an increase with increasing concentration. Finally, the foams stabilised by the gel particles made at pH 5 and the WPI showed the lowest viscosity values at all concentrations. It seems therefore that the gel particles made at pH 7 and more profoundly at pH 8 are able to create foams more resistant to deformation than the foams stabilised with gel particles made at pH 5 and non-treated WPI.

Figure 5:
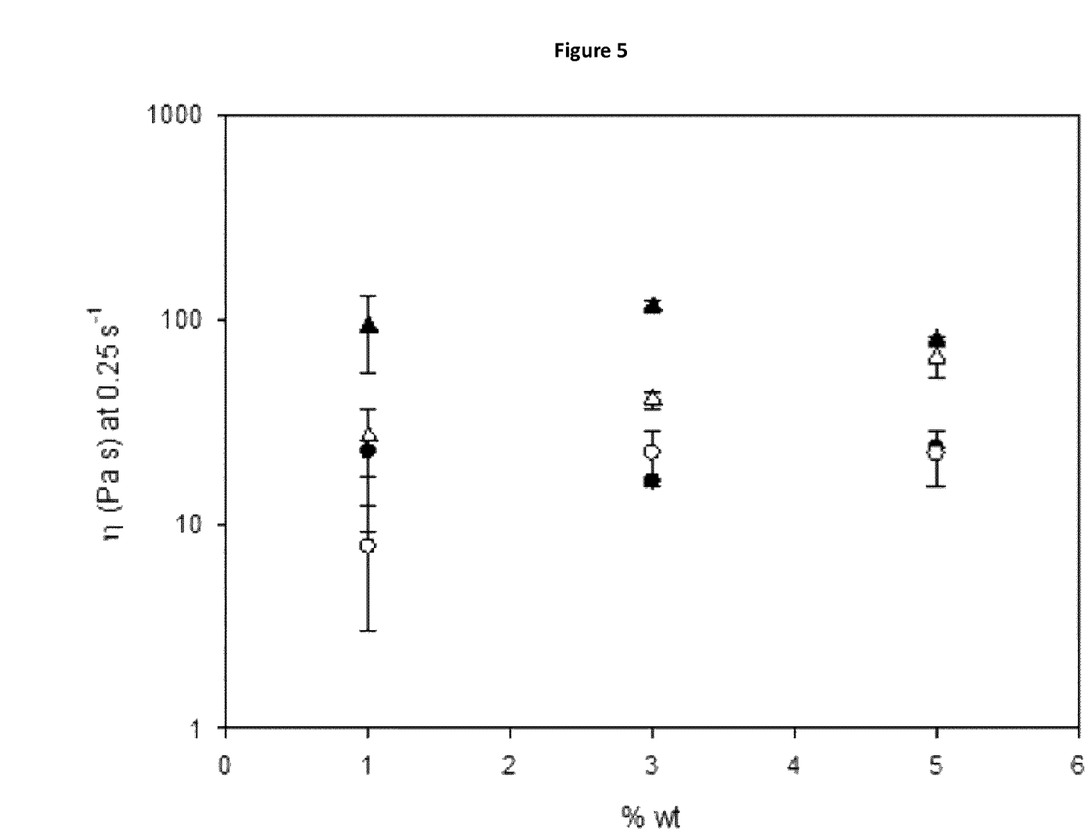
FIG. 5 represents the viscosities of foams obtained in Example 1 at 0.25 s$^{-1}$ stabilised by gel particles made at pH 5 (black dots), pH 7 (white dots) and pH 8 (black triangle) and WPI (white triangle) at the three different concentrations used in Example 1.

FIG. 5 represents the viscosities of foams at 0.25 $s^{-1}$ stabilised by gel particles made at pH 5 (black dots), pH 7 (white dots) and pH 8 (black triangle) and WPI (white triangle) at the three different concentrations.

3.3 Confocal Laser Microscopy

Evidence of the mechanism of increase of foam stability by reconstituted gelled whey protein particles was shown using confocal microscopy images, obtained by staining of the whey protein aggregate particles using rhodamine B. The particles made at pH 5 are small and spherical as indicated by the particle size analysis. They appear to have an affinity to the air water interface as it is revealed by their presence only on the surface of the air bubbles. In the case of the whey protein aggregate particles prepared at pH 7 and 8 the particles are larger and irregular in size. In this case the affinity to the air water interface is also present and the particles seem to block completely the plateau borders between the bubbles. This compact structure is probably the main reason why the particles made at pH 8 have higher performance in terms of foam stability, allowing less drainage and blocking the path of liquid from flowing between the bubbles.

3.4 Foam Stability

The stability of foams stabilised with the reconstituted dried particles was investigated in terms of foam half-life. The volume of foams created by air sparging was monitored over time and the time corresponding to the reduction of the foam to half of the original volume was recorded. The results (FIG. 6) show a significantly increased stability of the foams stabilised by the gel particles created at pH 8. The increase in stability has strong correlation with the increase of concentration within the range studied. Gel particles made at pH 5 also showed a moderate but significant increase in foam stability that was not concentration dependent. This indicates that the conditions under which the whey protein gels are made have a strong impact on the functionality of the dried particles obtained from them in terms of foaming.

Figure 6:
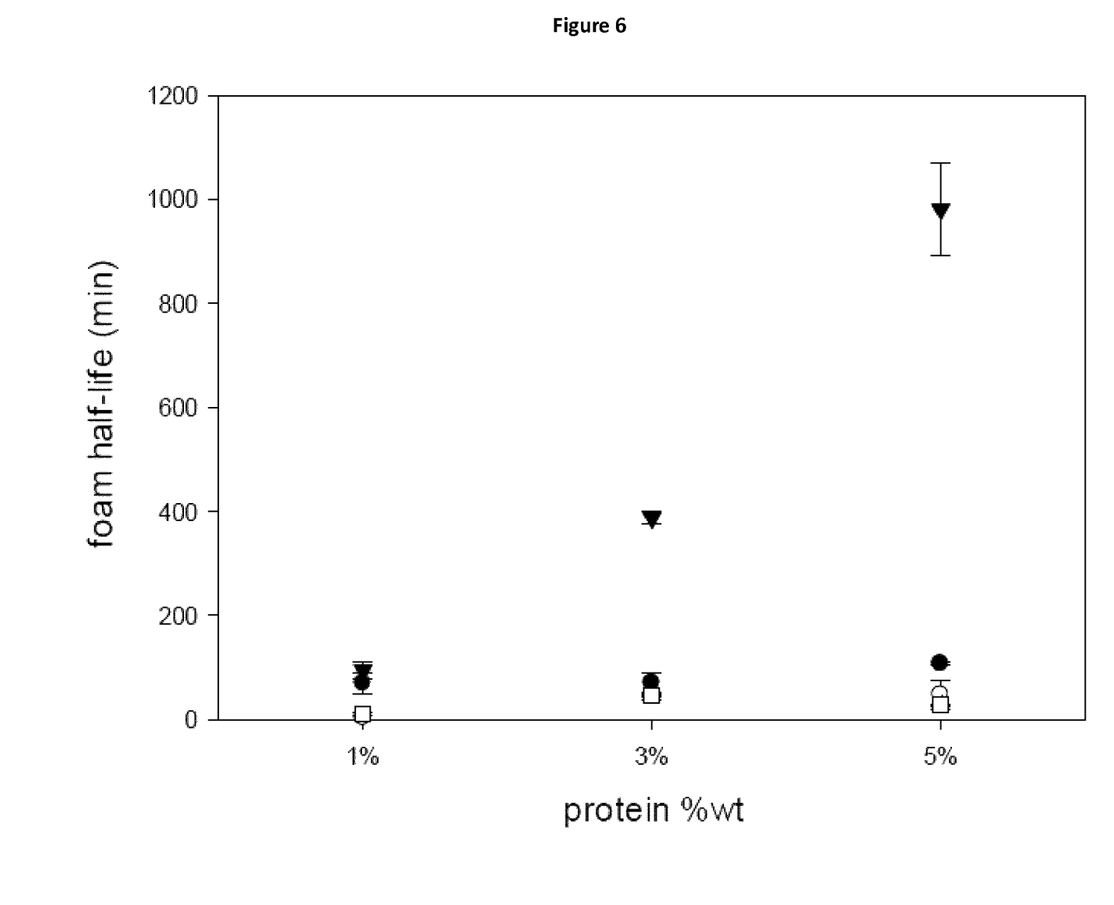
FIG. 6 represents a foam stability plot showing the half-life in minutes of the gel particle suspensions prepared at pH 5 (black dots), pH 7 (white dots), pH 8 (black triangles) and native WPI solutions (white triangles) at the different concentrations, as described in Example 1.
Figure 7:
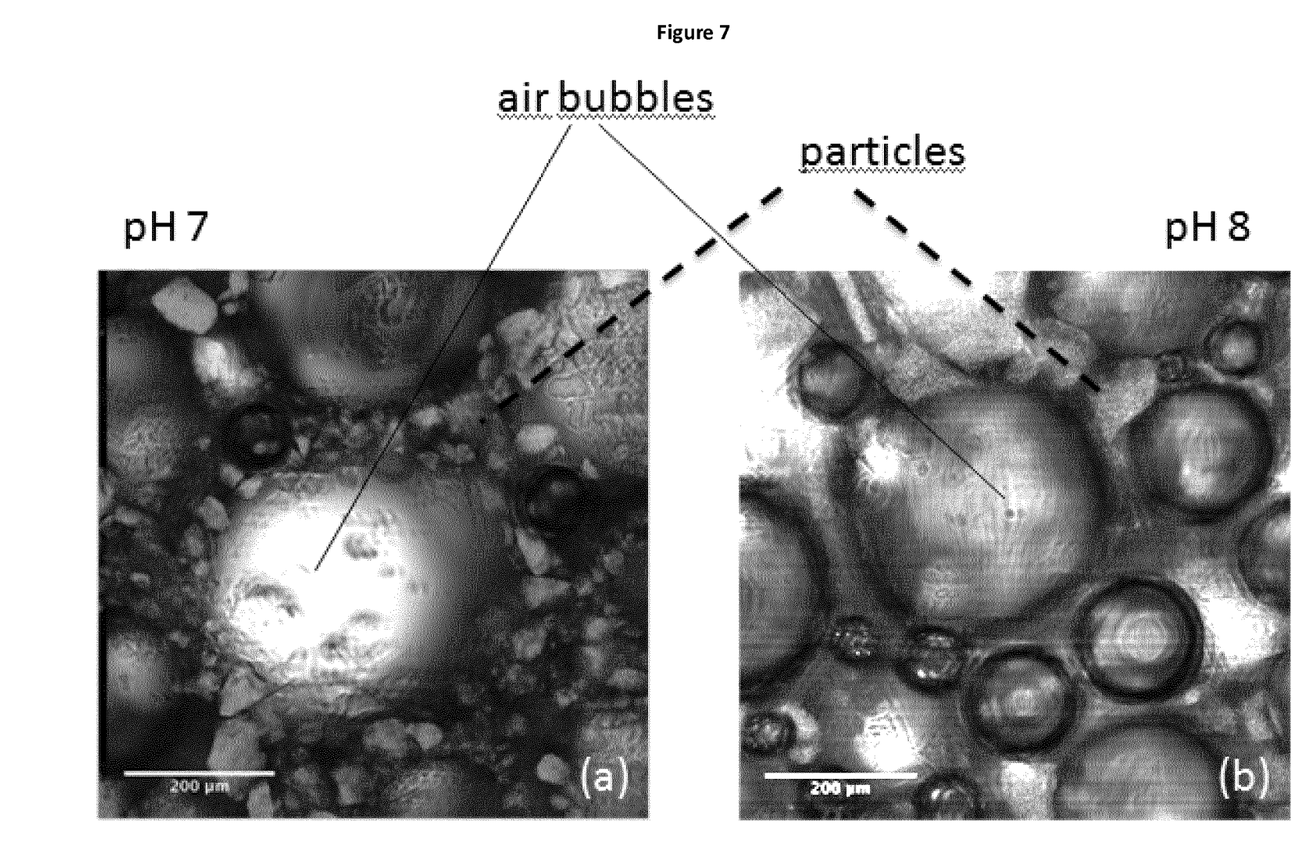
FIG. 7 shows a Confocal micrographs of foams stabilised with reconstituted whey protein aggregate particles gelled pH 7 (a) and pH 8 (b) obtained in Example 1.

FIG. 6 represents a foam stability plot showing the half-life in minutes of the gel particle suspensions prepared at pH 5 (black dots), pH 7 (white dots), pH 8 (black trianges) and native WPI solutions (white triangles) at the different concentrations.

4. Conclusions

As is shown in the foam stability results, aqueous suspensions of reconstituted whey protein aggregate particles can effectively stabilise foams. The stability of the foams produced is significantly affected by the conditions under which the heat denaturation and gelling of the whey proteins have taken place. Particles obtained from whey protein solutions of pH 8 that have been gelled and dehydrated have the higher effect on the improvement of the stability of the foams created. Additionally, the foams stabilised by the gel particles created at pH 8 exhibit higher viscosity values than at lower pH, showing that these foams are more resistant to flow. These particles as shown in the micrographs have the tendency to align on the air water interface and create physical barriers which along with the electrostatic repulsion but also the possible water binding capabilities can significantly reduce the factors that cause foam instability.

While both gel particles created at pH 7 and 8 upon reconstitution in water have a similar viscosity increasing effect they don't show any significant effect on the mechanical properties of the bulk solution in terms of storage or loss modulus. Furthermore these two different preparations (pH 7 and 8) while they have several similarities when in the bulk suspensions in terms of particle size, surface tension and rheological properties they show different performance when foamed. The reason of this effect needs to be further investigated in order to understand completely the mechanism with which the pH 8 gel particles stabilise liquid foams.

Finally the particles created by gelling close to the isoelectric point of whey proteins at pH 5 exhibit similar effects in terms of rheological and interfacial properties with the whey protein isolate suspensions probably due to their small size and lack of electrostatic charge. Their foam stabilisation contribution was higher than the control but still significantly lower than the particles made at pH 7 and even more at pH 8.

Example 2

A foamed milk was produced comprising whey protein aggregate of the invention produced from different sources of whey. The stability of the foam of such foamed milks has been compared to a reference consisting of the same foamed milk without whey protein aggregates of the invention.

Preparation of Whey Protein Aggregate Particles

The whey source (see Table 1 below) was dispersed in double distilled water and left stirring to hydrate for 1 h to form an aqueous protein solution. The pH of the solutions was then adjusted to pH8 using 5M NaOH or 5M HCl. The protein solution was then subjected to heating and gelling in a water bath at 80° C. for 30 minutes. Following the heating step the gels were cooled down in trays and then frozen at −20° C. for 24 h. The frozen gels were then freeze dried in a bench top freeze dryer, Scanvac model 110-4, (Copenhagen, Denmark) until samples reached room temperature. The dried gels were finally reduced in size using a ball mill for 2 hours.

TABLE 1 composition of the whey source

| Sample Reference | Whey source composition |
|---|---|
| Sample A | 12%[2)] Whey protein isolate[1)] |
| Sample B | 6%[2)] Whey protein isolate[1)] and 3%[2)] sweet whey |
| Sample C | 6%[2)] Whey protein isolate[1)] and 6%[2)] skim milk |

[1)]BiPRO obtained from Davisco Foods International Inc. (Le Sueur, MN, USA)
[2)]Percentages are defined as the percentage of protein by weight relative to the total weight of the aqueous solution Preparation of the Foamed Milk and Foam Decomposition Measurement An amount of 1 g of particles produced as described above was suspended in 99 g of refrigerated UHT milk (milk of the brand Emmi® bought in a supermarket in Switzerland) under magnetic stirring during 5 minutes. The milk was then foamed using a Nescafé® milk frother. The foamed milk was then poured in a 250 ml measuring cylinder.

A reference sample was prepared by foaming the UHT milk without addition of whey aggregate particles using the same foaming technique.

The foam height was measured for each sample 30 seconds after pouring into the cylinder. This height was then taken as the basis value to measure foam decomposition. The height of the foam and the height of the liquid phase under the foam were then measured after respectively 1, 3, 5, 10, 20, 60 and 120 minutes.

Figure 8:
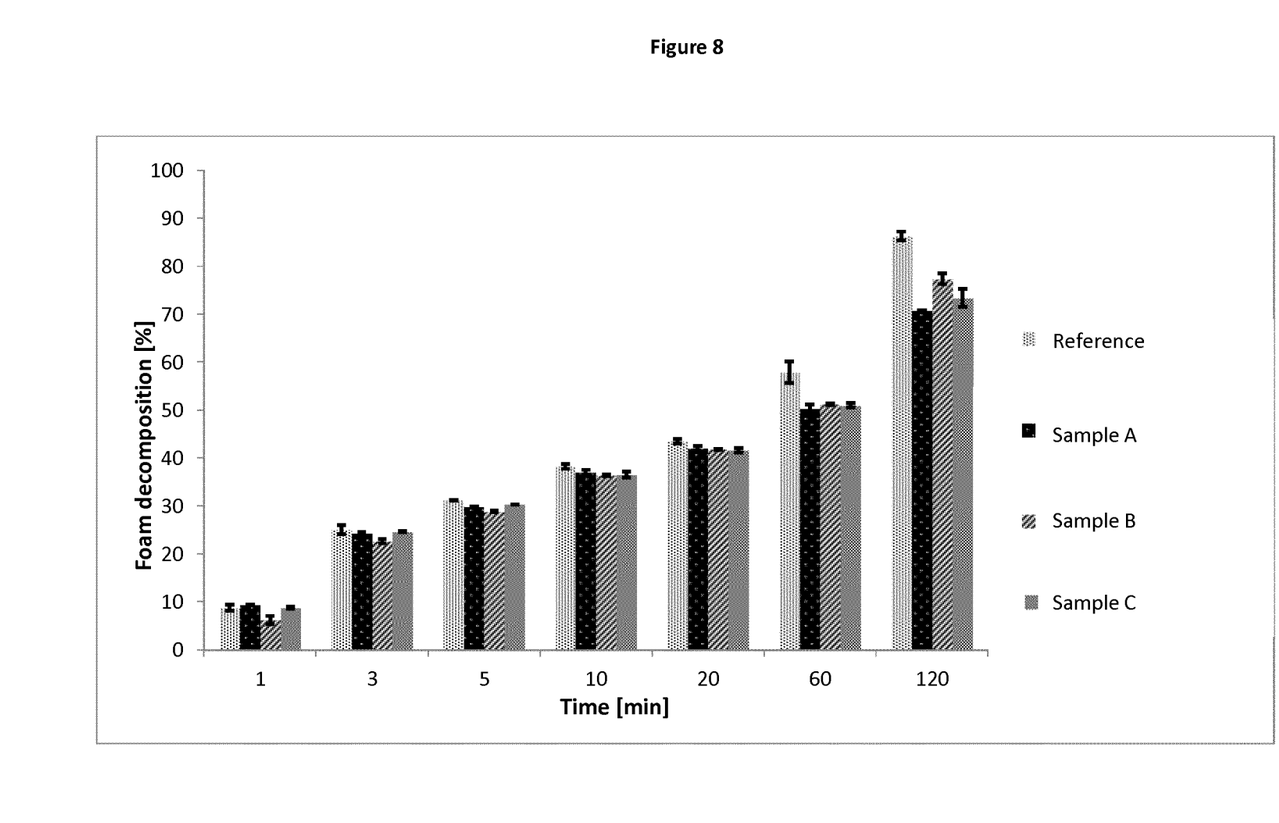
FIG. 8 shows the results of the foam stability measurements of Example 2 with whey protein aggregates produced from various whey source.

The results are represented in the graph of FIG. 8. The decomposition of the foam is significantly lower for all test samples A to C than for the reference sample after 1 hour. This effect is observed for all samples, thus showing the foam stabilizing effect of the whey aggregate particles of the invention is obtained with different sources of whey. The stabilizing effect is even larger after 120 minutes.

Example 3

A foamed milk was produced comprising whey protein aggregate of the invention with processes in which the milling step was varied, thus varying the particle size of the whey protein aggregates. The stability of the foam of such foamed milks has been compared to a reference consisting of the same foamed milk without whey protein aggregates of the invention.

Preparation of Whey Protein Aggregate Particles

Whey protein isolate (BiPRO obtained from Davisco Foods International Inc. (Le Sueur, Minn., USA)) was dispersed in aqueous solutions at 12 wt % protein concentration using double distilled water and left stirring to hydrate for 1 h to form an aqueous protein solution. The pH of the solutions was then adjusted to pH8 using 5M NaOH or 5M HCl. The protein solution was then subjected to heating and gelling in a water bath at 80° C. for 30 minutes. Following the heating step the gels were cooled down in trays and then frozen at −20° C. for 24 h. The frozen gels were then freeze dried in a bench top freeze dryer, Scanvac model 110-4, (Copenhagen, Denmark) until samples reached room temperature. The dried gels were finally reduced in size using the milling methods as per Table 2.

TABLE 2

Milling methods used for each test sample

| Sample Reference | Milling conditions | Median particle size |
|---|---|---|
| Sample D | Lab milling with a 0.12 mm lab mill | 62 μm |
| Sample E | Jet mill | 11 μm |
| Sample F | Ball Mill, 4 × 15 mm, 10 min Freqency: 25 | 23 μm |
| Sample G | Ball Mill, 12 × 10 mm, 10 min Freq. 25 | 31 μm |

Preparation of the Foamed Milk and Foam Decomposition Measurement

An amount of 2 g of particles produced as described above was suspended in 198 g of a 9.3% solution of skim milk powder in water at room temperature under magnetic stirring during 5 minutes. The milk was then foamed using a Thermomix® kitchen mixer for 2 minutes at level 3-4 with plastic attachment and with anti-clockwise rotation.

A reference sample was prepared by foaming the same reconstituted skim milk powder without addition of whey aggregate particles, using the same foaming technique.

The foam height was measured for each sample 30 seconds after pouring into the cylinder. This height was then taken as the basis value to measure foam decomposition. The height of the foam and the height of the liquid phase under the foam were then measured after respectively 1, 3, 5, 10, 20, 60 and 120 minutes.

Figure 9:
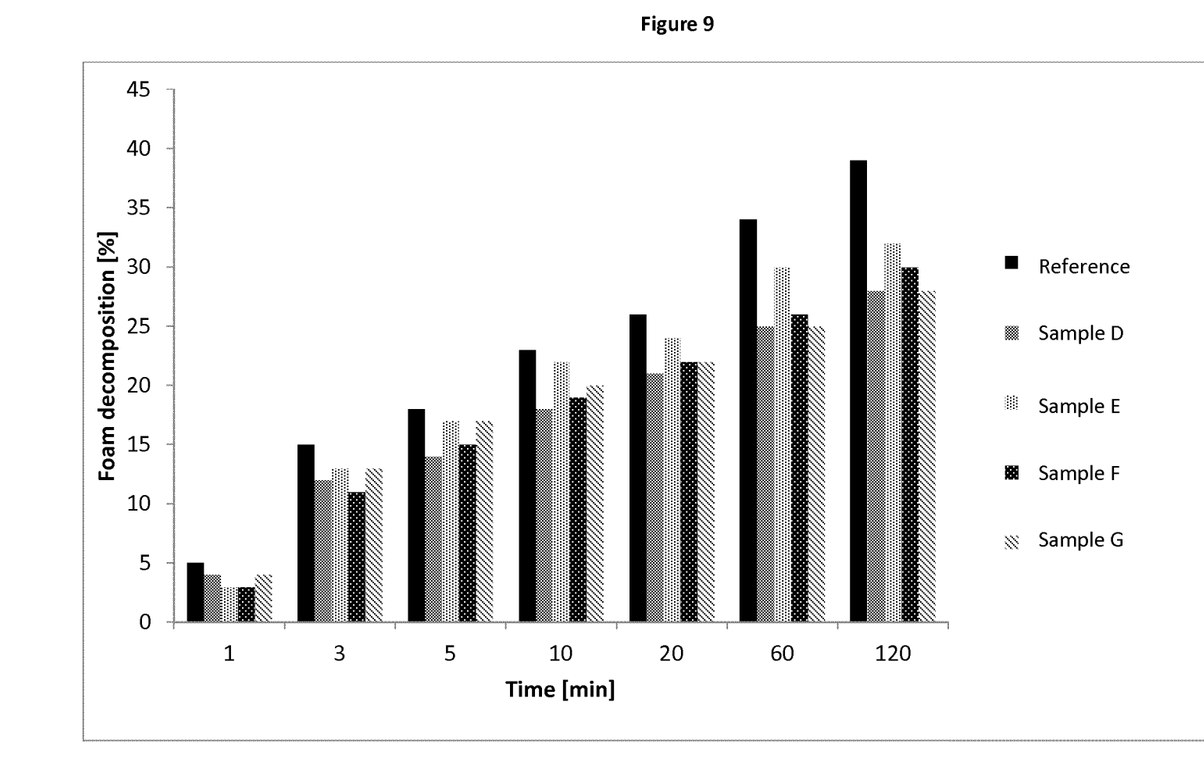
FIG. 9 shows the results of the foam stability measurements of Example 3 aggregates having various particle sizes and produced using various milling methods.
Figure 10:
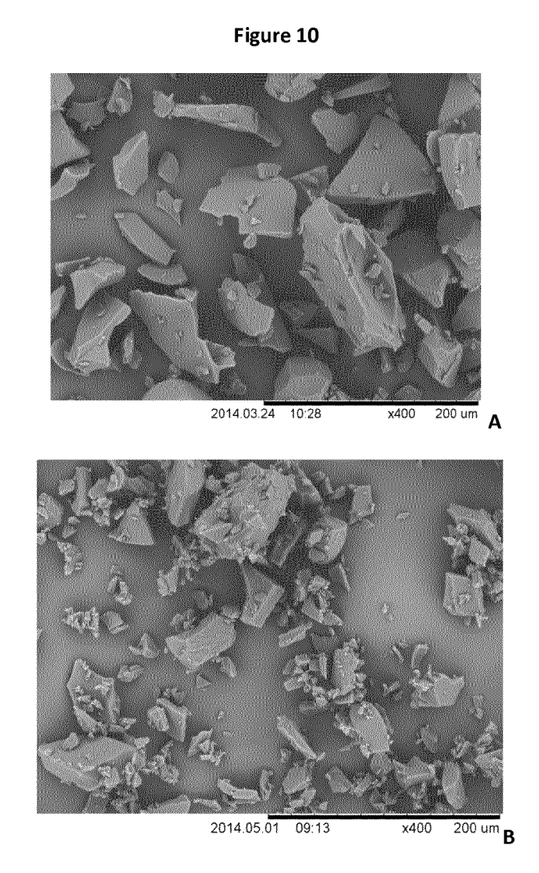
FIG. 10 shows microscope pictures of Samples D (FIG. 10A) and G (FIG. 10B) of Example 3. The irregular, non-spherical shape of the milled particles can be observed.

The results are represented in the graph of FIG. 9. The decomposition of the foam is significantly lower for all test samples D to G than for the reference sample after 1 hour. This effect is observed for all samples, thus showing the foam stabilizing effect of the whey aggregate particles of the invention is obtained with different particles have divers sizes above 5 μm. It also shows that diverse milling methods can be used while retaining the foam stabilizing effect. The stabilizing effect is even larger after 120 minutes.

The invention claimed is:

1. A process for the preparation of whey protein aggregate particles, the process comprising:
   a. dispersing whey protein in an aqueous medium to form an aqueous solution;
   b. adjusting the pH of the aqueous solution obtained in step a) to a pH above 7.1;
   c. allowing the whey protein to hydrate in the aqueous solution obtained in step b);
   d. denaturing and gelling the whey protein by heating the aqueous solution of hydrated whey protein obtained in step c) to a temperature above 76° C., the heating is applied to the aqueous solution such that the denatured and gelled whey protein has more than 90% of beta-lactoglobulin denaturation;
   e. drying the denatured and gelled whey protein obtained in step d) to form dry whey protein aggregate; and
   f. reducing the dry whey protein aggregate to a particle powder.

2. The process according to claim 1, wherein the whey protein dispersed in the aqueous solution in step a) is in the form of whey protein isolate or whey protein concentrate.

3. The process according to claim 1, wherein the adjusted pH of the aqueous solution in step b) does not exceed 9.

4. The process according to claim 1, wherein step f) is carried out by grinding or milling.

5. A method for creating an edible foam or for promoting the creation of the edible foam, the method comprising using whey protein aggregate particles to produce the edible foam, the whey protein aggregate particles being produced by the steps:
   a. dispersing whey protein in an aqueous medium to form an aqueous solution;
   b. adjusting the pH of the aqueous solution obtained in step a) to a pH above 7.1;
   c. allowing the whey protein to hydrate in the aqueous solution obtained in step b);
   d. denaturing and gelling the whey protein by heating the aqueous solution of hydrated whey protein obtained in step c) to a temperature above 76° C., the heating is applied to the aqueous solution such that the denatured and gelled whey protein has more than 90% beta-lactoglobulin denaturation;
   e. drying the denatured and gelled whey protein obtained in step d) to form dry whey protein aggregate; and
   f. reducing the dry whey protein aggregate to a particle powder.

6. A method for stabilizing an edible foam, the method comprising using whey protein aggregate particles to produce the edible foam, the particles being produced by the steps:
   a. dispersing whey protein in an aqueous medium to form an aqueous solution;
   b. adjusting the pH of the aqueous solution obtained in step a) to a pH above 7.1;
   c. allowing the whey protein to hydrate in the aqueous solution obtained in step b);
   d. denaturing and gelling the whey protein by heating the aqueous solution of hydrated whey protein obtained in step c) to a temperature above 76° C., the heating is applied to the aqueous solution such that the denatured and gelled whey protein has more than 90% beta-lactoglobulin denaturation;
   e. drying the denatured and gelled whey protein obtained in step d) to form dry whey protein aggregate; and
   f. reducing the dry whey protein aggregate to a particle powder.

7. The method according to claim 5, wherein the whey protein aggregate particles are used in a concentration of at least 1.5% by weight, based on the total weight of the edible foam.

8. A method for stabilizing a foam, the method comprising adding whey protein aggregate particles to an edible composition intended to be foamed prior to formation of the foam, the whey protein aggregate particles produced by the steps:
   a. dispersing whey protein in an aqueous medium to form an aqueous solution;
   b. adjusting the pH of the aqueous solution obtained in step a) to a pH above 7.1;
   c. allowing the whey protein to hydrate in the aqueous solution obtained in step b);
   d. denaturing and gelling the whey protein by heating the aqueous solution of hydrated whey protein obtained in step c) to a temperature above 76° C., the heating is applied to the aqueous solution such that the denatured and gelled whey protein has more than 90% beta-lactoglobulin denaturation;
   e. drying the denatured and gelled whey protein obtained in step d) to form dry whey protein aggregate; and
   f. reducing the dry whey protein aggregate to a particle powder.

9. A method for producing a foamed edible product, the method comprising adding whey protein aggregate particles to an edible composition prior to formation of a foam and then inducing foam formation in the edible composition to form the foamed edible product, the whey protein aggregate particles produced by the steps:
   a. dispersing whey protein in an aqueous medium to form an aqueous solution;
   b. adjusting the pH of the aqueous solution obtained in step a) to a pH above 7.1;
   c. allowing the whey protein to hydrate in the aqueous solution obtained in step b);
   d. denaturing and gelling the whey protein by heating the aqueous solution of hydrated whey protein obtained in step c) to a temperature above 76° C., the heating is applied to the aqueous solution such that the denatured and gelled whey protein has more than 90% beta-lactoglobulin denaturation;
   e. drying the denatured and gelled whey protein obtained in step d) to form dry whey protein aggregate; and
   f. reducing the dry whey protein aggregate to a particle powder.

10. The method according to claim 9, wherein the whey protein aggregate particles are added in a concentration of at least 1.5% by weight, based on the total weight of the foamed edible composition.

11. The method according to claim 6, wherein the whey protein aggregate particles are used in a concentration of at least 1.5% by weight, based on the total weight of the foam.

12. The method according to claim 1, wherein the whey protein dispersed in the aqueous medium comprises whey protein isolate.

13. The method according to claim 1, wherein at least 90% by volume of the whey protein aggregate particles have a particle size of at least 5 µm, and at least 90% by volume of the whey protein aggregate particles have a particle size of at most 50 µm.

14. The method according to claim 5, wherein the whey protein aggregate particles are added to an edible composition comprising casein.

15. The method according to claim 5, wherein the whey protein aggregate particles are 3 wt. % to 6 wt. % of the edible foam.

16. The method according to claim 6, wherein the whey protein aggregate particles are added to an edible composition comprising casein.

17. The method according to claim 8, wherein the edible composition comprises casein.

18. The method according to claim 9, wherein the edible composition comprises casein.

19. The process according to claim 1, wherein the adjusted pH of the aqueous solution in step b) is at least 7.5.

20. The process according to claim 1, wherein the adjusted pH of the aqueous solution in step b) is at least 8.0.

* * * * *